US006982940B1

(12) United States Patent
Kando et al.

(10) Patent No.: US 6,982,940 B1
(45) Date of Patent: Jan. 3, 2006

(54) METHOD AND APPARATUS FOR RECORDING AND/OR REPRODUCING INFORMATION TO ARBITRARILY SET FREQUENCY CONVERSION MULTIPLYING FACTOR

(75) Inventors: Hidehiko Kando, Matsudo (JP);
Hiroyuki Minemura, Kokubunji (JP);
Hirofumi Sukeda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/578,387

(22) Filed: May 25, 2000

(30) Foreign Application Priority Data

May 26, 1999 (JP) ................................. 11-145969

(51) Int. Cl.
*G11B 7/00* (2006.01)
(52) U.S. Cl. ............................... 369/47.54; 369/53.31; 369/59.23
(58) Field of Classification Search ............. 369/53.31, 369/59.23, 47.54
See application file for complete search history.

(56) References Cited

U.S. PATENT DOCUMENTS

| | | | | |
|---|---|---|---|---|
| 5,506,825 A | * | 4/1996 | Gushima et al. ............... 386/96 |
| 5,535,186 A | * | 7/1996 | Ishizawa .................... 369/47.3 |
| 5,604,727 A | * | 2/1997 | Ishihara .................... 369/47.28 |
| 5,828,639 A | * | 10/1998 | Kobayashi et al. ......... 369/47.4 |
| 6,028,828 A | * | 2/2000 | Maeda ....................... 369/47.4 |
| 6,097,695 A | * | 8/2000 | Kobayashi ................. 369/275.4 |
| 6,134,214 A | * | 10/2000 | Takagi et al. ............. 369/47.14 |
| 6,157,608 A | * | 12/2000 | Ishida et al. ............. 369/275.3 |
| 6,167,190 A | * | 12/2000 | Nagasawa .................... 386/111 |
| 6,192,015 B1 | * | 2/2001 | Kim ......................... 369/47.48 |
| 6,269,059 B1 | * | 7/2001 | Kuroda et al. ........... 369/47.28 |
| 6,339,571 B1 | * | 1/2002 | Torazawa et al. .......... 369/53.2 |
| 6,469,978 B1 | * | 10/2002 | Ohata et al. ............. 369/275.3 |
| 6,504,800 B1 | * | 1/2003 | Kuwahara et al. ........ 369/44.26 |
| 6,564,009 B2 | * | 5/2003 | Owa et al. .................. 386/126 |

FOREIGN PATENT DOCUMENTS

EP 08 00 276 10/1997
WO WO 98 43 241 10/1998

* cited by examiner

*Primary Examiner*—A M Psitos
(74) *Attorney, Agent, or Firm*—Kenyon & Kenyon

(57) ABSTRACT

Heretofore, if the recording mark arranging method in a track is changed, the physical format on the disk is also changed, as in DVD-Rs and DVD-RAMs. This makes it difficult to attain interchangeability between data recorded in a plurality of different recording mark arranging methods. There is provided a method which makes it possible to arbitrarily set a frequency conversion multiplying factor to be used when generating a write clock from a signal obtained by detecting track deformation periodically provided on a recording track, which makes it possible to arbitrarily set a total number of channel bits in a single track, and which thereby implements a plurality of different recording mark arranging methods on disks having the same physical format.

7 Claims, 6 Drawing Sheets

LENGTH OF ONE SECTOR

WOBBLE SIGNAL

MAGNIFIED VIEW OF THE WOBBLE SIGNAL AT THE BEGINNING POINT OF THE SECTOR

FIG. 2B  WRITE CLOCK A (LOW LINEAR DENSITY MODE)

FIG. 2C  MARK ARRANGEMENT WITH WRITE CLOCK A

USER DATA FIELD

FIG. 2D  WRITE CLOCK B (HIGH LINEAR DENSITY MODE)

FIG. 2E  MARK ARRANGEMENT WITH WRITE CLOCK B

BUFFER FIELD 1   USER DATA FIELD   BUFFER FIELD 2
MIRROR FIELD 1                      MIRROR FIELD 2

METHOD AND APPARATUS FOR RECORDING AND/OR REPRODUCING INFORMATION TO ARBITRARILY SET FREQUENCY CONVERSION MULTIPLYING FACTOR

BACKGROUND OF THE INVENTION

The present invention relates to an information recording and reproducing method and an information recording and reproducing apparatus using an information recording medium on which information can be recorded by applying an energy beam. In particular, the present invention relates to an information recording and reproducing method of providing the arrangement and structure of a sequence of recording marks in a sector with a degree of freedom and implementing a plurality of recording mark arrangement methods on substrates having the same format, and an information recording and reproducing apparatus for implementing the plurality of recording mark arrangement methods.

A recording medium called DVD-RAM (hereafter referred to as DVD-RAM) has a feature that it has a sector structure having a pre-pit ID, a land and a groove forming a recording track are wobbled, and a recording field has, besides the data field storing user data, a buffer and a guard preceding a data field, a VFO field, and a guard and a buffer following the data field. The buffers, guards, and VFO field have been introduced in keeping with the sector structurization and insurance of overwrite life.

On the other hand, on a recording medium called DVD-R (hereafter referred to as DVD-R), a groove forming a recording track is wobbled, and land pre-pits are arranged periodically on a land. From a wobbling signal of the groove and a land pre-pit detection signal, the period of wobbling is found with high precision and the timing at the time of recording is determined by referring to the period. The buffers, guards, and VFO field as in the DVD-RAM are not present.

Although both the DVD-RAM and the DVD-R are writable DVDs, they have entirely different substrate formats and physical formats. Because of a difference in use target value and a difference in possibility of rewriting, there is rationality in that different formats are used for the DVD-RAM and the DVD-R. However, the recording and reproducing apparatus needs to cope with different techniques for respective formats. There is inconvenience that in a recording and reproducing apparatus coping with only one of the formats a disk having the other of the formats cannot be utilized. When the drive copes with both formats, complication of the drive structure is caused.

SUMMARY OF THE INVENTION

An object of the present invention is to make it possible to use both the DVD-RAM type sector structure and the DVD-R type sector structure freely and properly on the same substrate format as occasion demands and hold down the complication of the drive structure to the minimum.

Furthermore, the present invention is capable of making it possible to use a pertinent sector structure more simply and selectively and minimizing the complication of the structure of the recording and reproducing apparatus.

Therefore, another object of the present invention is to form a highly reliable recording and reproducing apparatus.

The above described problems can be solved by using the following information recording and reproducing method, and information recording and reproducing apparatus.

(1) An information recording and reproducing method in which information is recorded by irradiating a recording track on a recording medium with an energy beam and thereby forming recording marks, the information recording and reproducing method including the steps of: wobbling or deforming the recording track with a predetermined period; generating a recording clock from a signal obtained by detecting the wobble or deformation of the recording track; generating the recording marks in synchronism with the recording clock; and setting a conversion multiplying factor between a period of the signal obtained by detecting the wobble or deformation and a period of the recording clock, based on pre-recorded information of control data on the recording medium.

(2) An information recording and reproducing apparatus including: an energy beam generator; a power adjusting mechanism for adjusting a power level of an energy beam generated by the energy beam generator; a holding mechanism capable of holding a recording medium; a moving mechanism for irradiating the recording medium with the energy beam and relatively moving the energy beam with respect to the recording medium; and a detector for detecting an energy beam reflected or transmitted in the information recording and reproducing apparatus, a recording track on the recording medium being wobbled or deformed with a predetermined period, the wobble or deformation of the recording track being detected based upon a detection signal supplied from the energy beam detector, a recording clock being generated from a signal obtained by detecting the wobble or deformation, a power level of the energy beam being changed in synchronism with the recording clock, a conversion multiplying factor between a period of the signal obtained by detecting the wobble or deformation and a period of the recording clock being set based on pre-recorded information of control data on the recording medium.

Unlike the DVD-R type sector structure, it is necessary in the DVD-RAM type sector structure to provide the buffers, guards, and VFO portion before and after the user data field. As compared with the DVD-R, therefore, the total number of channel bits in a single sector is larger in the DVD-RAM. By making the total number of channel bits written into a single sector variable, therefore, it becomes basically possible to support both the DVD-R type recording mark arrangement and the DVD-RAM type recording mark arrangement. This can be implemented by changing the number of recording clocks per unit physical length on the recording medium and making the total number of channel bits within the same sector length variable. Such an increase or decrease of the number of channel bits is determined on the basis of the information of the recommended number of channel bits per sector recorded on the recording medium beforehand. In other words, the conversion multiplying factor between the period of wobbling and deformation and the period of the recording clock at the time when generating the recording clock from the period of the periodic wobbling and deformation of the recording clock is changed as occasion demands. By doing so, either of the DVD-R type recording mark arrangement, the DVD-RAM type recording mark arrangement, and a different arrangements can be implemented on disks having the same substrate format.

One example of a recording method using such a plurality of recording mark arranging methods will now be described. If DVD-R type recording is to be conducted and a rewritable phase change medium is used as the recording film, then generally the number of overwriting becomes slightly smaller, the average recording mark length can be made slightly longer, and sufficient characteristics can be obtained even on a medium having a poor signal-to-noise ratio. Therefore, such disks are suitable to inexpensive disks (home video recorders and other applications) which are limited in number of times of overwriting to a small value. Furthermore, in the case of DVD-RAM type recording, a guard field for preventing the floating or the like can be provided, and consequently a long overwrite life is ensured. In addition, since the average mark length is slightly short, a medium having a high signal-to-noise ratio is needed. Therefore, such disks are suitable to slightly high-class (expensive) disks which are sufficiently ensured in number of times of overwriting (optical disk recording apparatuses for computer subjected to rewriting at any time and other applications).

Another example of a recording method using a plurality of recording mark arranging methods will now be described. Data recorded in a video recorder using an optical disk by means of the DVD-R type recording can be simply read out as it is by a personal computer. Furthermore, data subjected to high-grade video editing in a personal computer while being subjected to the DVD-RAM type recording can also be simply reproduced by a video recorder. Until now as well, it has been possible to form such a system. If the present invention is used, however, both the DVD-R type recording and the DVD-RAM type recording are conducted on disks having the same physical format. Therefore, data interchangeability and drive interchangeability can be achieved at extreme ease, and a highly reliable system can be formed.

BRIEF DESCRIPTION OF THE DRAWINGS

FIGS. 2A–2E are timing diagrams at the time of recording showing an embodiment of the present invention.

DESCRIPTION OF THE EMBODIMENTS

The present invention will be described in detail by referring to the following embodiments.

Figure 1:
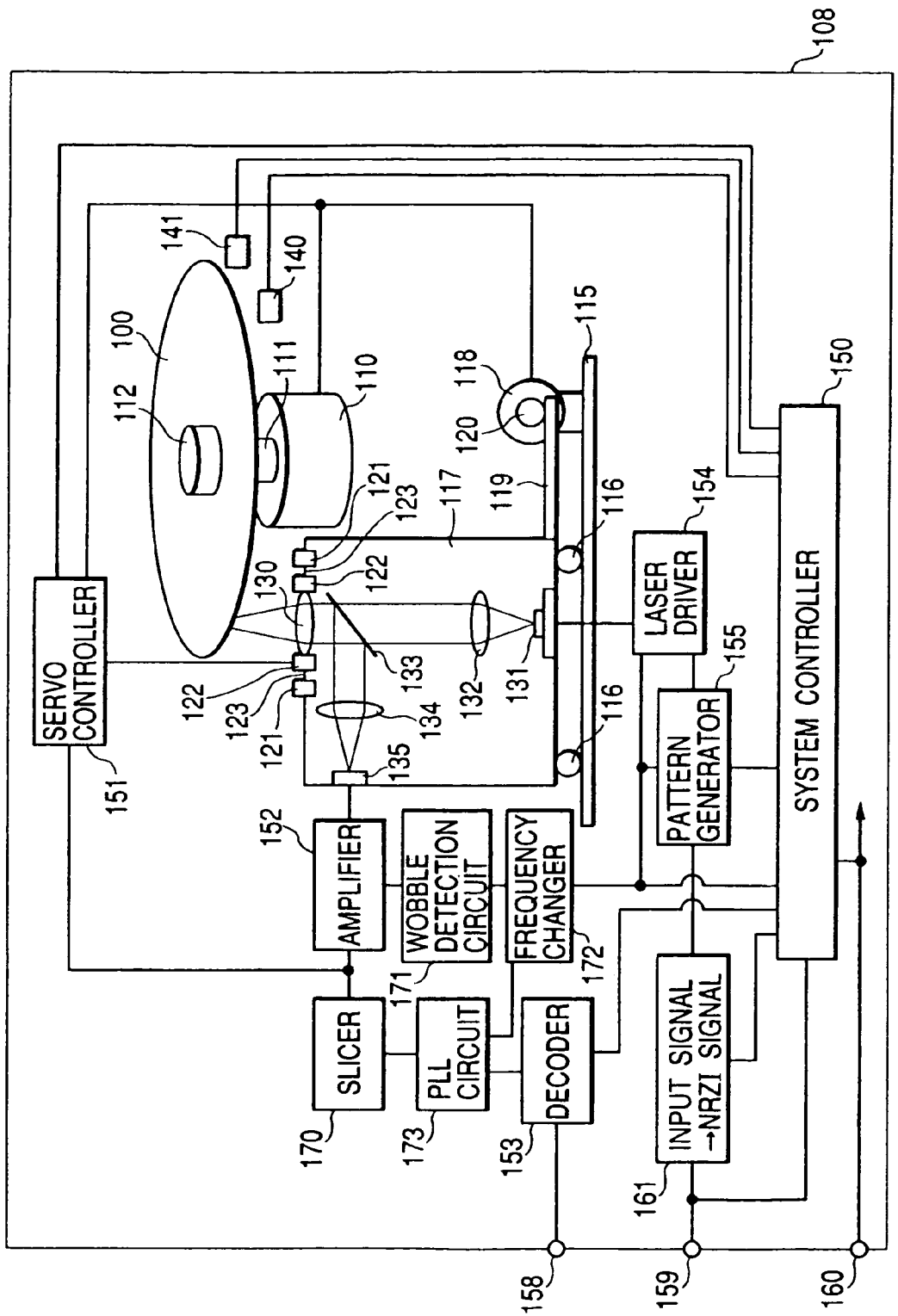
FIG. 1 is a configuration diagram of a recording and reproducing apparatus showing an embodiment of the present invention.

FIG. 1 is a block diagram of an information recording and reproducing apparatus showing an embodiment of the present invention. For the purpose of description, a recording medium 100 is shown to be mounted on the information recording and reproducing apparatus. For recording information, the recording medium 100 is indispensable. As occasion demands, however, the recording medium 100 is dismounted from or mounted on the information recording and reproducing apparatus.

In FIG. 1, a chucking mechanism 112 is attached to a rotary shaft 111 of a motor 110 which is attached to a cabinet 108. The chucking mechanism 112 holds the recording medium 100. In other words, the chucking mechanism 112 serves as a holding mechanism of the recording medium 100. Furthermore, the motor 110, the rotary shaft 111, and the chucking mechanism 112 form a movement mechanism for relatively moving the recording medium 100 and the energy beam.

A rail 115 is attached to the cabinet 108. Rail guides 116 guided by the rail 115 are attached to a case 117. A rectilinear gear 119 is attached to the case 117. A rotary gear 120 is attached to the rectilinear gear 119. By conveying the rotation of a rotary motor 118 attached to the cabinet 108 to the rotary gear 120, the case 117 conducts rectilinear motion along the rail 115. The direction of the rectilinear motion is approximately the radius direction of the recording medium 100.

Magnets 121 are attached to the case 117. Furthermore, an object lens 130 is attached to the case 117 via suspensions 123. The suspensions 123 makes the object lens 130 movable only in two directions: approximately the normal line direction of the recording face of the recording medium 100 and approximately the radius direction of the recording medium 100. Coils 122 are attached to the object lens 130 so as to be approximately opposed to the magnets 121. By letting flow a current through the coils 122, the object lens 130 can be moved through a magnetic effect, in the two directions: approximately the normal line direction of the recording face of the recording medium 100 and approximately the radius direction of the recording medium 100. The rail 115, the rail guides 116, the case 117, the magnets 121, the suspensions 123, the coils 122, and the object lens 130 form a positioning mechanism for positioning the energy beam in a predetermined position on the recording medium 100.

A semiconductor laser 131 serving as an energy beam generator is attached to the case 117. An energy beam emitted from the semiconductor laser 131 passes through a collimate lens 132 and a beam splitter 133, and then passes through the object lens 130. A part of light emitted from the object lens 130 is reflected by the recording medium, passed through the object lens 130, reflected by the beam splitter 133, and focused by a detection lens 134. Its light intensity is detected by a photodetector 135. The photodetector 135 is divided into a plurality of light receiving areas. Light intensities detected by respective light receiving areas are amplified by an amplifier 152 and are subjected to calculation. Information (serve signal) of relative position relation between an optical spot focused by the object lens 130 and the recording medium 100, and an information readout signal are detected. The servo signal is sent to a servo controller 151. Furthermore, the readout signal is sent to a decoder 153.

If the recording medium 100 is mounted on the information recording and reproducing apparatus, and the chucking mechanism 112 fixes the recording medium 100, then a detector 140 is activated and its signal is sent to a system controller 150. Upon receiving the signal, the system controller 150 controls the motor 110 and thereby rotates the recording medium 100 so as to attain a proper number of revolutions. Furthermore, the system controller 150 controls the rotary motor 118 and positions the case 117 in a proper position. Furthermore, the system controller 150 makes the semiconductor laser 131 emit light. In addition, the system controller 150 activates the servo controller 151. The servo controller 151 activates the rotary motor 118. The servo controller 151 lets flow a current through the coils 122 and thereby positions a focus spot formed by the object lens 130 in a predetermined position on the recording medium 100. Subsequently, the servo controller 151 sends a signal to the system controller 150 to notify it that the focus spot has been formed on the recording medium 100. The system controller 150 gives an order to the decoder 153 to decode a signal read out. If a track to be subjected to readout is not an information track in a control data zone, then the system controller 150 gives an order to the servo controller 151 so as to position the focus spot on an information track in the control data zone. As a result of the above described operation, the system controller 150 reads information from the information track of the control data zone, and reads out information of a medium concerning the recording and reproducing.

If an information write order and information to be written are given by a high rank controller via an input connector 159, then the system controller 150 gives an order to the servo controller 151 and thereby positions the focus spot on a proper track on the recording medium 100. A signal obtained by the photodetector 135 is amplified by the amplifier 152. The amplified signal is conveyed to a wobble detection circuit 171. The track has periodic wobbling or deformation. This period is detected by the wobble detection circuit 171. What detected by the wobble detection circuit is wobbling of a recording track, a shape change of grooves periodically formed in the time sequence readout direction of a recording track, pre-pits periodically formed in the time sequence readout direction of a recording track, or a combination of them. The period signal detected by the wobble detection circuit 171 is converted in period (frequency) by a frequency conversion circuit 172 to become a recording and reproducing clock fundamental wave. As for the conversion multiplying factor of the frequency conversion circuit 172, a conversion multiplying factor indicating value recorded on an information track in the control data zone beforehand is adopted.

Information to be written is passed through a signal processing circuit 161 and converted to a NRZI signal therein. The signal converted to the NRZI signal is conveyed to a pattern generator circuit 155. Along the method of recording mark arrangement in a sector indicated by the system controller 150, the pattern generator circuit 155 arranges a pattern of a user data area to be recorded in the sector, arrangement of recording marks (buffers and other fields) to be annexed to the user data area so as to precede it, and arrangement of recording marks (buffers and other fields) to be annexed to the user data area so as to follow it, and completes a sequence of patterns of recording mark arrangement in the sector. The pattern generator circuit 155 is supplied with the recording and reproducing fundamental clock generated by the frequency conversion circuit 172. The pattern generator circuit 155 sends recording patterns generated thereby one after another to a laser driver circuit 154 in synchronism with the recording and reproducing clock. In response to a recording mark pattern to be written supplied from the pattern generator circuit 155, the laser driver circuit 154 generates write pulses in synchronism with the recording and reproducing clock generated by the frequency conversion circuit 172, and sends the write pulses to the semiconductor laser 131 to drive the semiconductor laser 131. As a result, the semiconductor laser 131 emits light, and the quantity of energy emitted from the semiconductor laser 131 is temporally modulated according to the information to be written. The recording medium is irradiated with the emitted light via the collimate lens 132 and the object lens 130. As a result, a recording mark is formed on the recording medium.

In the case where recording marks are formed by using an intensity change of light with which a recording medium is irradiated as in DVD-RAMs and optical magnetic disks of optical modulation type, information to be recorded appears finally as a drive current change of the semiconductor laser 131. This drive current change is in synchronism with the recording and reproducing clock fundamental wave. Furthermore, in the case of optical magnetic disks of magnetic field modulation type, the drive current of the semiconductor laser 131 is modulated at a fixed period in synchronism with the recording and reproducing clock fundamental wave. In addition, the intensity and direction of the external magnetic field supplied to the recording medium is changed in synchronism with the recording and reproducing clock fundamental wave while it is being modulated according to information to be recorded.

In the above described example, the wobble period detected by the wobble detection circuit 171 is used to generate the recording and reproducing clock fundamental wave. Besides the generation of the recording and reproducing clock fundamental wave, the wobble period detected by the wobble detection circuit 171 is used to control the number of revolutions of the spindle motor 110 in some cases.

If an information reproduction order is given by the high rank connector via the input connector 159, then the system controller 150 gives an order to the servo controller 151 and thereby positions the focus spot on a proper track on the recording medium 100. A signal obtained by the photodetector 135 is amplified by the amplifier 152. The amplified signal is conveyed to the wobble detection circuit 171 and a slicer 170.

The slicer 170 binarizes the reproduced signal obtained by the amplifier 152.

The track has periodic wobbling or deformation. This period is detected by the wobble detection circuit 171. What detected by the wobble detection circuit 171 is wobbling of a recording track, a shape change of grooves periodically formed in the time sequence readout direction of a recording track, pre-pits and/or special recording marks periodically formed in the time sequence readout direction of a recording track, or a combination of them. The period signal detected by the wobble detection circuit 171 is converted in period (frequency) by the frequency conversion circuit 172 to become a recording and reproducing clock fundamental wave. As for the conversion multiplying factor of the frequency conversion circuit 172, a conversion multiplying factor indicating value recorded on the information track in the control data zone beforehand is adopted. The recording and reproducing clock fundamental wave generated by the frequency conversion circuit 172 is input to a PLL circuit 173. The PLL circuit 173 is conducting self-excited oscillation at the same frequency as the recording and reproducing clock fundamental wave. However, the PLL circuit 173 is capable of adjusting the phase relation between the recording and reproducing clock fundamental wave supplied from the frequency conversion circuit 172 and the self-excited wave. The PLL circuit 173 adjusts the phase of the self-excited wave and generates a reproducing clock. The phase adjustment is conducted so that the reproducing clock will be most satisfactorily synchronized to the binarized reproduced signal supplied from the slicer 170. The reproducing clock and the binarized reproduced signal are conveyed to the decoder 153 via the PLL circuit. Data which have been recorded are decoded. Information read out is sent to the high rank controller via an output connector 158.

In the above described example, the wobble detection signal is subjected to frequency conversion to generate the recording and reproducing clock fundamental wave. The reproducing clock is thus obtained. As for the reproduction, there is also conceivable a method of reproducing the reproducing clock by using only the reproduced signal of recorded data without using the wobble detection signal. Furthermore, it is also conceivable to control the number of revolutions of the spindle motor 110 by using the wobble period detected by the wobble detection circuit 171.

In the embodiment heretofore described with reference to FIG. 1, the number of channel bits in the unit sector is made variable. By changing the number of channel bits in the unit sector, a recording and reproducing apparatus which can apply a different recording mark arrangement in the sector to the recording medium of the same format can be implemented.

Subsequently, a different embodiment of the present invention will be described by referring to FIG. 2. FIG. 2 shows a periodic signal recorded beforehand on a track on which recording marks are to be recorded and how to take timing of recording by using the periodic signal. Each of FIGS. 2A–2E shows the configuration in a sector. The left side shows the head of a sector, and the right side shows the tail of the sector.

Figure 2A:
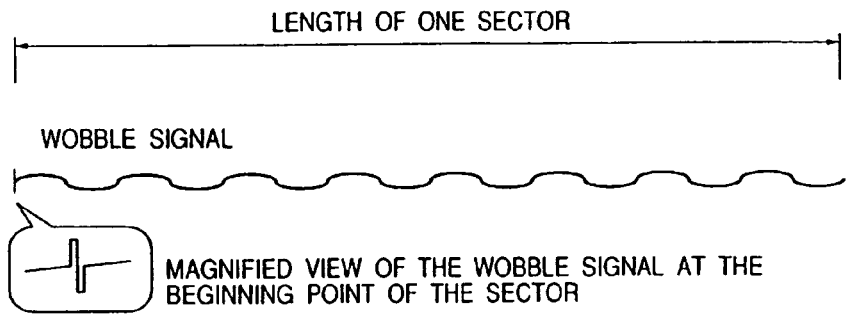
Figure 2A:
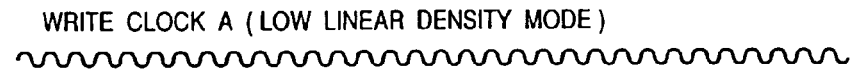
Figure 2A:
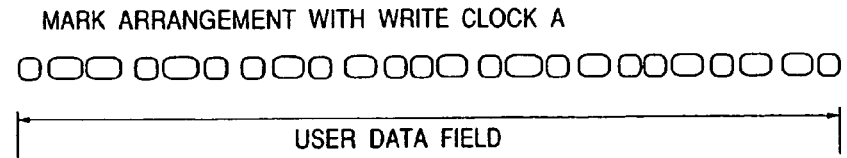
Figure 2A:
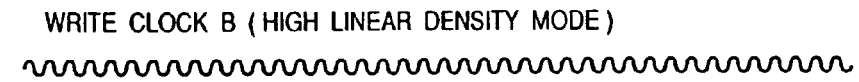
Figure 2A:
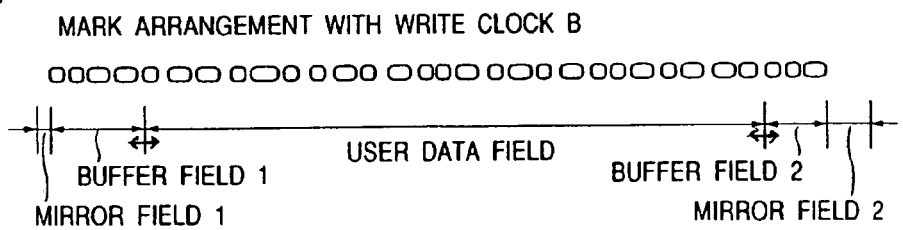

In FIG. 2A shows a signal obtained by reproducing deformations periodically recorded on a track. There is a track deformation portion in a sector head portion. Therefore, there is a spike-like signal in the sector head portion of the wobble signal, and this indicates the sector head portion. The signal of this portion is hereafter referred to as sector head signal. Furthermore, the wobble signal for detecting wobbling of the track groove has been formed over the entire area of the sector. In other words, two kinds of periodic structure are provided in a track for recording in this example. One of them is wobbling of the track groove, and its repetition period is shorter than the sector repetition period. The other of them is deformation of the track groove, and its repetition period is the same as the sector repetition period.

The period of the wobble signal is subjected to frequency conversion with an appropriate multiplying factor. As the multiplying factor of the frequency conversion, a value recorded on a recording medium as a recommended value beforehand is adopted, or it is arbitrarily determined at the time of recording. It is important that the frequency conversion multiplying factor is not fixed, but it can be changed as occasion demands.

By using a certain frequency conversion multiplying factor A, a write clock A shown in FIG. 2B is generated from the wobble signal shown in FIG. 2A. By using this write clock, data are recorded in the sector as shown in FIG. 2C. Here, an initial phase of a write clock A at the time when generating the write clock A shown in FIG. 2B from the wobble clock shown in FIG. 2A is made proper so as to always make the recording start position of data a proper position. Here, by using the sector head signal located in the track head portion of the wobble signal shown in FIG. 2A, the initial phase of the write clock A is determined so as to start the data recording always from a proper position of the sector head portion.

By using a different frequency conversion multiplying factor B, a write clock B shown in FIG. 2D is generated from the wobble signal shown in FIG. 2A. Here, the frequency conversion multiplying factor B is different from the frequency conversion multiplying factor A, and the frequency of the write clock B is made higher than the frequency of the write clock A. By using the write clock B, data are recorded in the sector as shown in FIG. 2E. Here, an initial phase of a write clock at the time when generating the write clock B shown in FIG. 2D from the wobble clock shown in FIG. 2A is made proper so as to always make the recording start position of data a proper position. Here, by using the sector head signal located in the track head portion of the wobble signal shown in FIG. 2A, the initial phase of the write clock B is determined so as to start the data recording always from a proper position of the sector head portion. In data arrangement of FIG. 2E, a mirror field 1, a buffer field 1, a user data field, a buffer field 2, and a mirror field 2 exist within the sector, beginning from the sector head portion. Here, the arrangement and configuration of the user data field shown in FIG. 2C are the same as the arrangement and configuration of the user data field shown in FIG. 2E. Comparing FIG. 2C with FIG. 2E, the mark length in FIG. 2E is generally made shorter than that in FIG. 2E. The total number of channel bits per sector in FIG. 2E is larger than the total number of channel bits per sector in FIG. 2C. The mirror fields 1 and 2 function in the same way as mirror fields of the DVD-RAM medium. The buffer fields 1 and 2 function in the same way as various fields preceding or following a user data field, such as buffers, VFOs, guards, and PAs of the DVD-RAM medium. In the case where the recording medium is a phase change medium, there is adopted in some cases a technique of improving the writing characteristic by randomly changing the writing start timing and polarity.

Describing in conformity with the embodiment described in FIG. 1, it can be said that the method of FIGS. 2B and 2C is the DVD-R type recording method and the method of FIGS. 2D and 2E is the DVD-RAM type recording method.

By the way, in the case of reproduction, the reproducing clock can be generated from the reproduced signal of data, without necessarily using the wobble signal of FIG. 2A. If the reproducing clock is to be reproduced from the wobble signal of FIG. 2A, then the frequency conversion multiplying factor between the wobble signal and the write clock used at the time of recording is recorded on the recording medium beforehand, and the conversion multiplying factor is read out and used to obtain the reproducing clock fundamental wave from the wobble clock. If the reproducing clock fundamental wave is used as the input signal of the PLL circuit and the phase of the reproducing clock fundamental wave is adjusted in the PLL circuit by using the reproduced signal of the data, then the reproducing clock can be obtained easily.

According to the embodiment described with reference to FIGS. 2A–2E, the signal of FIG. 2A becomes the wobble signal detected by the wobble detection circuit 171. Each of the write clocks shown in FIGS. 2B and 2D becomes the recording and reproducing clock fundamental wave generated by the frequency conversion circuit 172 of FIG. 1. However, FIG. 2B is different in multiplying factor of frequency conversion from FIG. 2D. In FIGS. 2C and 2E show marks recorded on the recording medium 100 of FIG. 1 by using the write clocks FIGS. 2B and 2D, respectively.

Figure 3A:
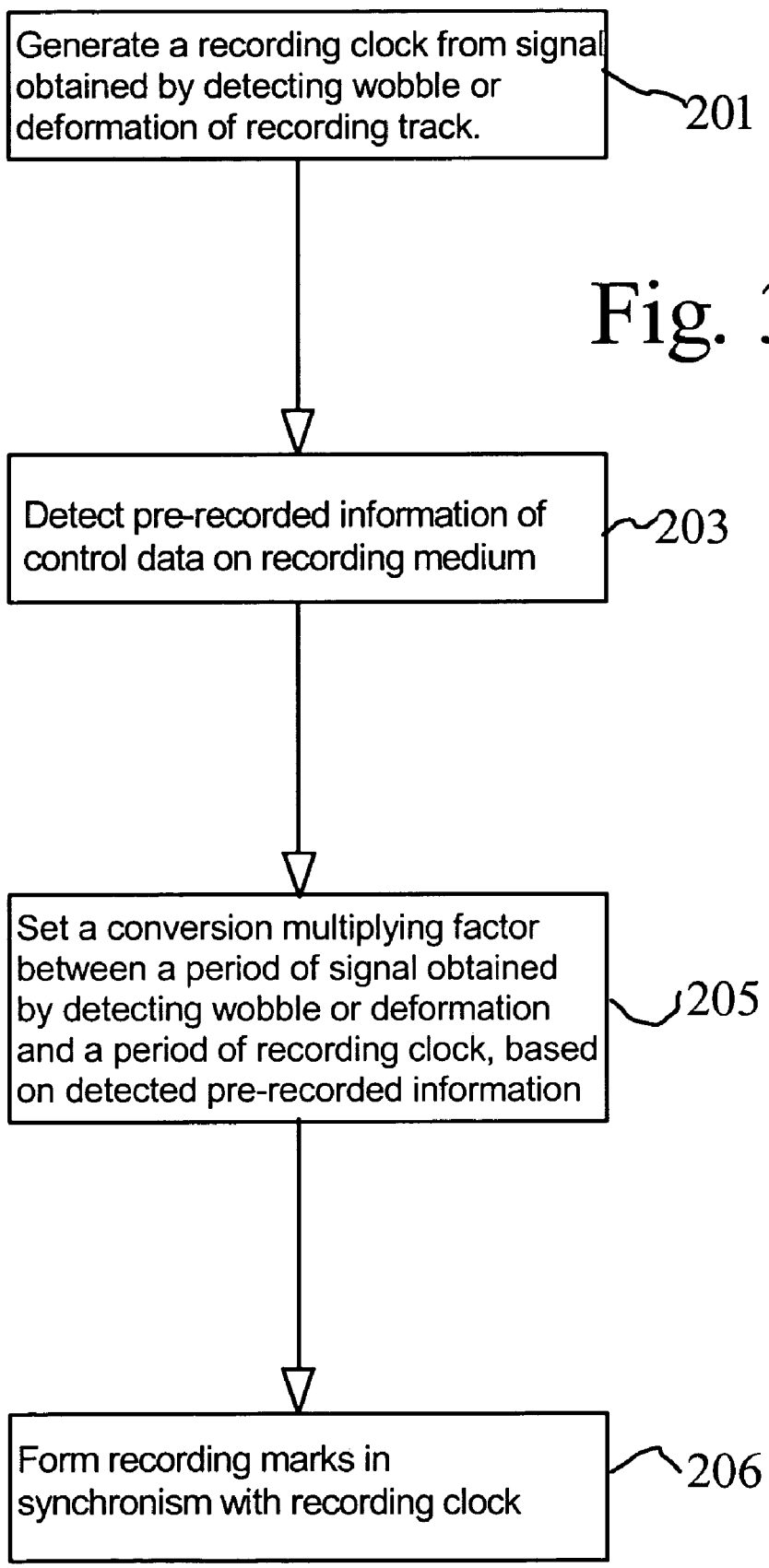
FIGS. 3A–3C are flow diagrams illustrating embodiments of the recording method of the present invention.
Figure 3B:
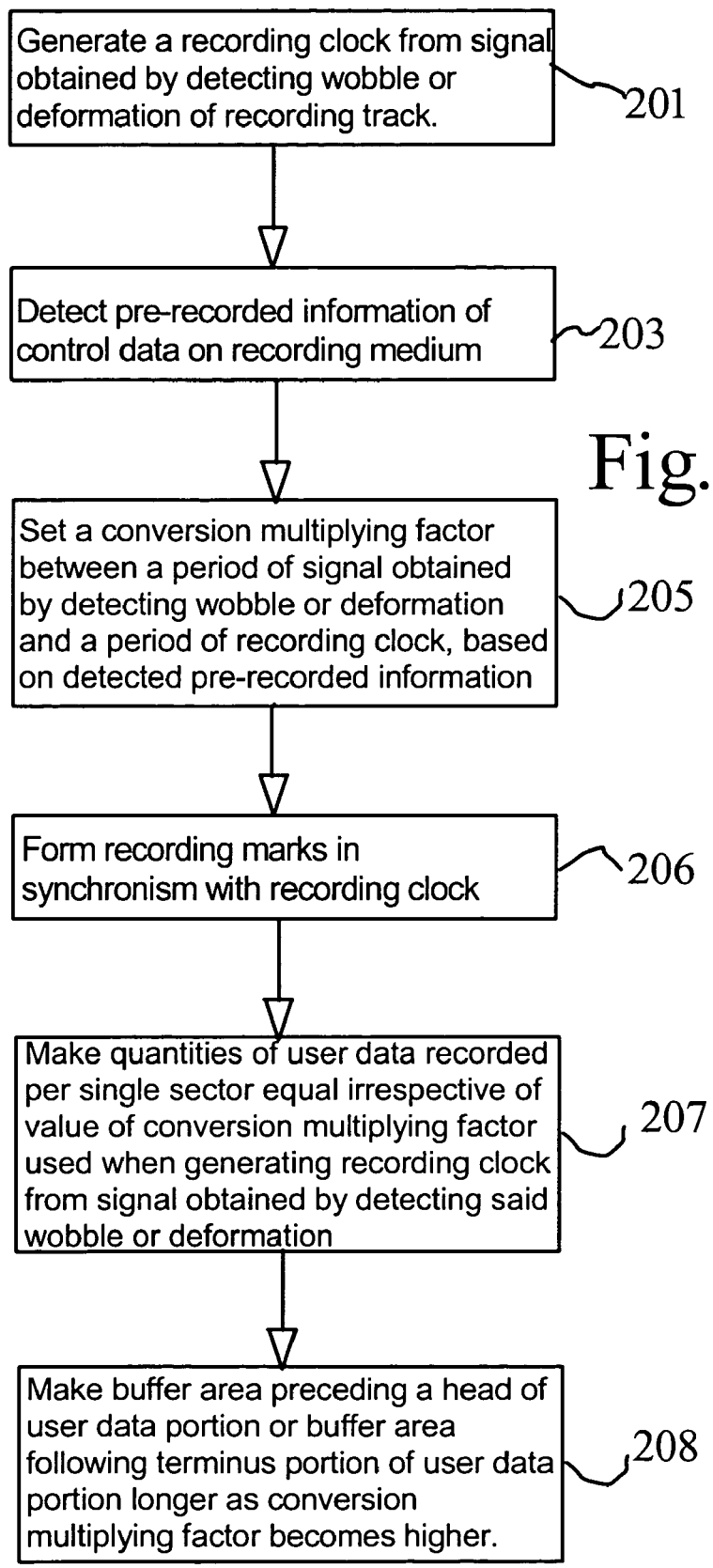
Figure 3C:
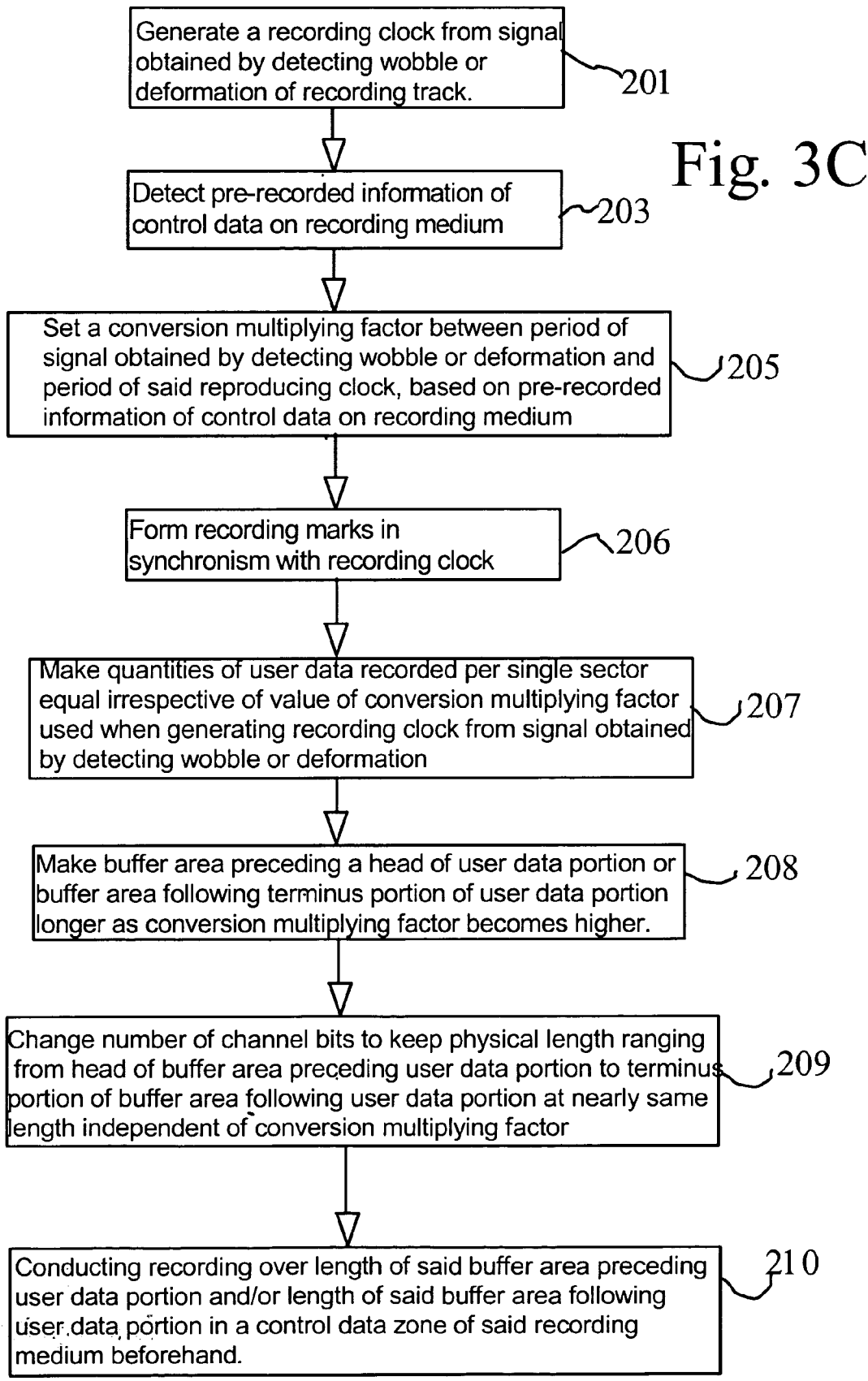

FIGS. 3A–3C illustrate embodiments of the method of recording according to the present invention as discussed above. Thus, as illustrated by FIG. 3A, the method of the present invention includes a step 201 of generating a recording clock from a signal obtained by detecting the wobble or deformation of the recording track. Next the system detects pre-recorded information of control data on the recording medium as indicated by step 203. Then as shown in step 205, a conversion multiplying factor is set between a period of the signal obtained by detecting said wobble or deformation and a period of the recording clock, based on said detected pre-recorded information. Finally, in step 206 the recording marks are formed in synchronism the recording clock.

In FIG. 3B additional steps are included. These include step 207 of making quantities of user data recorded per single sector equal irrespective of a value of the conversion multiplying factor used when generating the recording clock from the signal obtained by detecting said wobble or deformation, and step 208 in which a length of a buffer area preceding a head of a user data portion or a buffer area following a terminus portion of the user data portion is made longer as the conversion multiplying factor becomes higher.

Furthermore, as illustrated in FIG. 3C additional steps can be performed. For example, in step 209 a physical length ranging from a head of the buffer area preceding the user data portion to a terminus portion of the buffer area following the user data portion is kept at nearly the same length independently of the conversion multiplying factor by changing the number of channel bits. In addition to this step, step 210 may also be performed. In accordance with step 210, recording is conducted over a length of the buffer area preceding the user data portion and/or a length of the buffer area following the user data portion in a control data zone of the recording medium beforehand.

Figure 4:
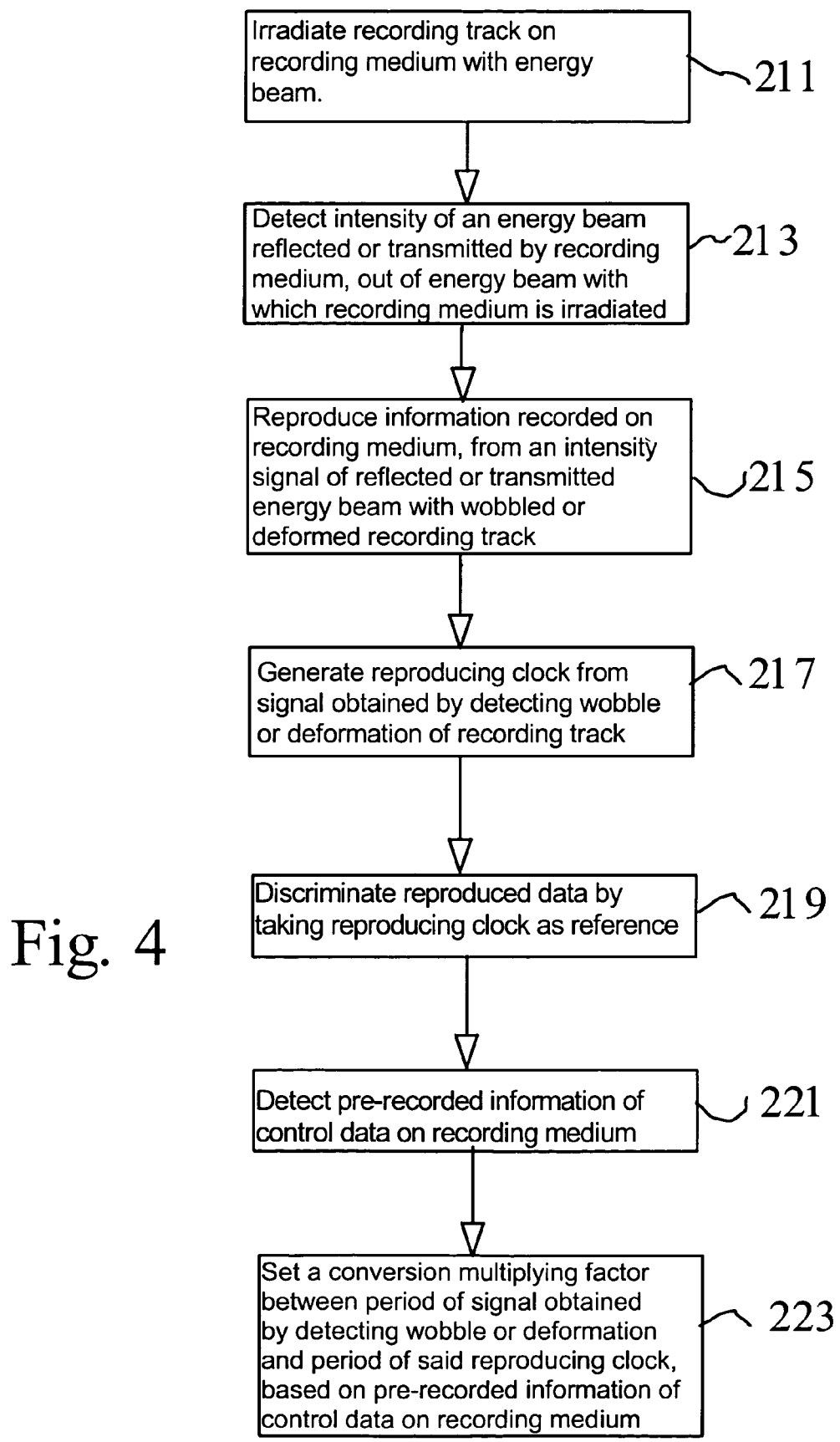
FIG. 4 is a flow diagram illustrating the reproducing method of the present invention.

FIG. 4 illustrates the method of reproducing according to the present invention. At step 211, a recording track on a recording medium is irradiated with an energy beam. Then as indicated by step 213, the intensity of the energy beam reflected or transmitted by the recording medium out of the energy beam with which said recording medium is irradiated is detected. This is followed step 215 of reproducing information recorded on said recording medium, from the intensity signal of the reflected or transmitted energy beam, with the recording track being wobbling or deforming with a predetermined period. As indicated by step 217, a reproducing clock is generated from a signal obtained by detecting the wobble or deformation of the recording track. Using this reproducing clock as a reference, in step 219 the reproduced data is discriminated. In step 221, pre-recorded information of control data on the recording medium is detected. And, as indicated by step 223, a conversion multiplying factor is set between a period of the signal obtained by detecting the wobble or deformation and a period of the reproducing clock, based on the pre-recorded information of control data on the recording medium.

By virtue of the present invention, a method of arranging recording marks in a sector can be selected pertinently and selectively. This facilitates creation of a pertinent recording medium, and increases the interchangeability of recording information pieces written in a plurality of recording mark arranging methods. This results in an effect that highly reliable data recording and reproducing can be conducted easily.

What is claimed is:

1. An information recording method in which information is recorded by irradiating a recording track on a recording medium with an energy beam and thereby forming recording marks, said recording track being wobbling or deforming with a predetermined period, said information recording method comprising the steps of:
   generating a recording clock from a signal obtained by detecting the wobble or deformation of said recording track;
   detecting pre-recorded information including data for determining different kinds of recording mark arrangements of control data on said recording medium; and
   setting a conversion multiplying factor between a period of the signal obtained by detecting said wobble or deformation and a period of said recording clock, based on said detected pre-recorded information; and
   forming said recording marks in synchronism with said recording clock.

2. An information recording method according to claim 1, further comprising the steps of:
   making quantities of user data recorded per single sector equal irrespective of a value of the conversion multiplying factor used when generating said recording clock from said signal obtained by detecting said wobble or deformation; and
   making a length of a buffer area preceding a head of a user data portion or a buffer area following a terminus portion of said user data portion longer as the conversion multiplying factor becomes higher.

3. An information recording method according to claim 2, further comprising the step of keeping a physical length ranging from a head of said buffer area preceding said user data portion to a terminus portion of said buffer area following said user data portion at a nearly same length independently of said conversion multiplying factor by changing the number of channel bits.

4. An information recording method according to claim 3, further comprising the step of conducting recording over a length of said buffer area preceding said user data portion and/or a length of said buffer area following said user data portion in a control data zone of said recording medium beforehand.

5. An information recording apparatus comprising:
   an energy beam generator
   a power adjusting mechanism for adjusting a power level of an energy beam generated by said energy beam generator;
   a holding mechanism capable of holding a recording medium;
   a moving mechanism for irradiating said recording medium with said energy beam and relatively moving said energy beam with respect to said recording medium to thereby form recording marks;
   a detector for detecting an energy beam reflected or transmitted in said information recording apparatus, a recording track on said recording medium being wobbled or deformed with a predetermined period and said recording medium pre-recording information including data for determining different kinds of recording mark arrangements of control data;
   a wobble or deformation detection circuit to detect the wobble or deformation of the recording track based on a detection signal supplied from the energy beam detector;
   a recording clock formation circuit to generate a recording clock from a signal obtained by detecting the wobble or deformation, and a power level of the energy beam being changed in synchronism with said recording clock by the power adjusting mechanism; and
   a frequency changer circuit to change a conversion multiplying factor between a period of the signal obtained by detecting said wobble or deformation and a period of said recording clock, based on said pre-recorded information of control data detected by said detector.

6. An information reproducing method comprising the steps of:
   irradiating a recording track on a recording medium with an energy beam;
   detecting an intensity of an energy beam reflected or transmitted by said recording medium, out of said energy beam with which said recording medium is irradiated;
   reproducing information recorded on said recording medium, from an intensity signal of said reflected or transmitted energy beam, the recording track being wobbling or deforming with a predetermined period;
   generating a reproducing clock from a signal obtained by detecting the wobble or deformation of said recording track;
   discriminating reproduced data by taking said reproducing clock as a reference;
   detecting pre-recorded information including data for determining different kinds of recording mark arrangements of control data on said recording medium; and setting a conversion multiplying factor between a period of the signal obtained by detecting said wobble or deformation and a period of said reproducing clock, based on said pre-recorded information of control data detected by said detecting step.

7. An information reproducing apparatus comprising:

an energy beam generator;

a power adjusting mechanism for adjusting a power level of an energy beam generated by said energy beam generator;

a holding mechanism capable of holding a recording medium;

a moving mechanism for irradiating said recording medium with said energy beam and relatively moving said energy beam with respect to said recording medium;

a detector for detecting an energy beam reflected or transmitted in said recording medium whose recording track is being wobbled or deformed with a predetermined period and on which information of control data is pre-recorded;

a clock generation circuit to generate a reproducing clock from a signal obtained by detecting the wobble or deformation of the recording track, and reproduced data being discriminated by taking said reproducing clock as a reference; and a frequency changer circuit to change a conversion multiplying factor between a period of the signal obtained by detecting said wobble or deformation and a period of said reproducing clock, based on said pre-recorded information including data for determining different kinds of recording mark arrangements of control data detected by said detector.

* * * * *